(12) United States Patent
Gokmen et al.

(10) Patent No.: US 12,026,609 B2
(45) Date of Patent: *Jul. 2, 2024

(54) AREA AND POWER EFFICIENT IMPLEMENTATION OF RESISTIVE PROCESSING UNITS USING COMPLEMENTARY METAL OXIDE SEMICONDUCTOR TECHNOLOGY

(71) Applicant: INTERNATIONAL BUSINESS MACHINES CORPORATION, Armonk, NY (US)

(72) Inventors: Tayfun Gokmen, Briarcliff Manor, NY (US); Seyoung Kim, White Plains, NY (US); Dennis M. Newns, Yorktown Heights, NY (US); Yurii A. Vlasov, Champaign, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,570

(22) Filed: May 18, 2023

(65) Prior Publication Data
US 2023/0289585 A1    Sep. 14, 2023

Related U.S. Application Data

(63) Continuation of application No. 15/242,691, filed on Aug. 22, 2016, now Pat. No. 11,741,352.

(51) Int. Cl.
G06N 3/06 (2006.01)
G06N 3/065 (2023.01)
G06N 3/084 (2023.01)

(52) U.S. Cl.
CPC ............. G06N 3/065 (2023.01); *G06N 3/084* (2013.01)

(58) Field of Classification Search
CPC ........................... G06N 3/0635; G06N 3/084
See application file for complete search history.

(56) References Cited

U.S. PATENT DOCUMENTS

| 5,704,014 A | 12/1997 | Marotta et al. |
| 8,832,009 B2 | 9/2014 | Rose et al. |
| (Continued) | | |

FOREIGN PATENT DOCUMENTS

| CN | 104573238 A | 4/2015 |
| CN | 105160401 A | 12/2015 |
| (Continued) | | |

OTHER PUBLICATIONS

Boser, B.E. et al., "An Analog Neural Network Processor with Programmable Topology" IEEE Journal of Solid-State Circuits (Dec. 1991) pp. 1-9, vol. 26, No. 12.

(Continued)

*Primary Examiner* — Michael J Huntley
*Assistant Examiner* — Imad Kassim
(74) *Attorney, Agent, or Firm* — Tutunjian & Bitetto, P.C.; Robert Richard Aragona

(57) ABSTRACT

A resistive processing unit (RPU) that includes a pair of transistors connected in series providing an update function for a weight of a training methodology to the RPU, and a read transistor for reading the weight of the training methodology. In some embodiments, the resistive processing unit (RPU) further includes a capacitor connecting a gate of the read transistor to the air of transistors providing the update function for the resistive processing unit (RPU). The capacitor stores said weight of training methodology for the RPU.

20 Claims, 7 Drawing Sheets

(56) References Cited

U.S. PATENT DOCUMENTS

| | | | |
|---|---|---|---|
| 9,165,246 B2 | 10/2015 | Pickett | |
| 9,256,823 B2* | 2/2016 | Sinyavskiy | G06N 3/049 |
| 2002/0030205 A1* | 3/2002 | Varshavsky | G06N 3/063 |
| | | | 257/E27.06 |
| 2015/0106314 A1 | 4/2015 | Birdwell et al. | |
| 2015/0106316 A1 | 4/2015 | Birdwell et al. | |
| 2015/0278682 A1* | 10/2015 | Saxena | G11C 13/0007 |
| | | | 365/45 |
| 2015/0347896 A1 | 12/2015 | Roy et al. | |
| 2017/0011290 A1* | 1/2017 | Taha | G06N 3/065 |

FOREIGN PATENT DOCUMENTS

| | | |
|---|---|---|
| JP | 6-274661 A | 9/1994 |
| JP | 10-269309 A | 10/1998 |
| WO | 2015165809 A2 | 11/2015 |

OTHER PUBLICATIONS

Li, A. et al., "A Reconfigurable Approach to Implement Neural Networks for Engineering Application" Proceedings of the 6th World Congress on Intelligent Control and Automation (Jun. 2006) pp. 2939-2943.

List of IBM Patents or Patent Applications Treated as Related dated May 18, 2023, 2 pages.

\* cited by examiner f(x) = (INPUT 1*CONNECTION STRENGTH 1 + INPUT 2 * CONNECTION STRENGTH 2)

AREA AND POWER EFFICIENT IMPLEMENTATION OF RESISTIVE PROCESSING UNITS USING COMPLEMENTARY METAL OXIDE SEMICONDUCTOR TECHNOLOGY

BACKGROUND

Technical Field

The methods and structures described herein relate in general to configurations of trainable resistive crosspoint devices, which are referred to herein as resistive processing units (RPUs). More particularly, the present description relates to artificial neural networks (ANNs) formed using complementary metal oxide semiconductor technology.

Description of the Related Art

Resistive processing units (RPUs) indicate trainable resistive crosspoint circuit elements which can be used to build artificial neural networks (ANNs) and dramatically accelerate the ability of ANNs by providing local data storage and local data processing. Since a large network of RPUs are required to implement practical ANNs, finding a low-power and small-area RPU implementation can contribute to taking advantage of the RPU-based ANN implementation.

SUMMARY

In one aspect, a resistive processing unit (RPU) composed of three field effect transistor (FET) semiconductor devices and a capacitor that are provided using complementary metal oxide semiconductor (CMOS) technology that operates in a subthreshold regime. In one embodiment, the resistive processing unit (RPU) includes a pair of transistors connected in series providing an update function for a weight of a training methodology to the RPU, and a read transistor for reading the weight of the training methodology. The RPU may further include a capacitor connecting a gate of the read transistor to the pair of transistors providing the update function for the RPU. The capacitor stores the weight of training methodology for the RPU.

In another embodiment, a resistive processing unit is provided that includes four FET semiconductor devices and a capacitor that are provided using complementary metal oxide semiconductor (CMOS) technology that operates in the subthreshold regime. In some embodiments, the resistive processing unit (RPU) includes a first pair of transistors connected in series providing an update function for a weight of a training methodology to the RPU, and a second pair of transistors for reading the weight of the training methodology by differential weight reading. The RPU may further include a capacitor connecting at least one gate of the second pair of read transistor to the first pair of transistors providing the update function for the RPU. The capacitor stores the weight of training methodology for the RPU.

In another aspect, a method of storing the weight of training in resistive processing unit of artificial neural network is provided. In some embodiments, the method may include providing capacitor for storing the weight of training for resistive crosspoint circuit elements for an artificial neural network. A first pair of transistors is connected to the capacitor for updating the weight of training stored on the capacitor. At least one read transistor having a gate structure connected to the capacitor reads the weight of training stored on the capacitor.

BRIEF DESCRIPTION OF THE DRAWINGS

The following description will provide details for some embodiments of resistive processing units with reference to the following figures wherein.

DETAILED DESCRIPTION

Figure 1:
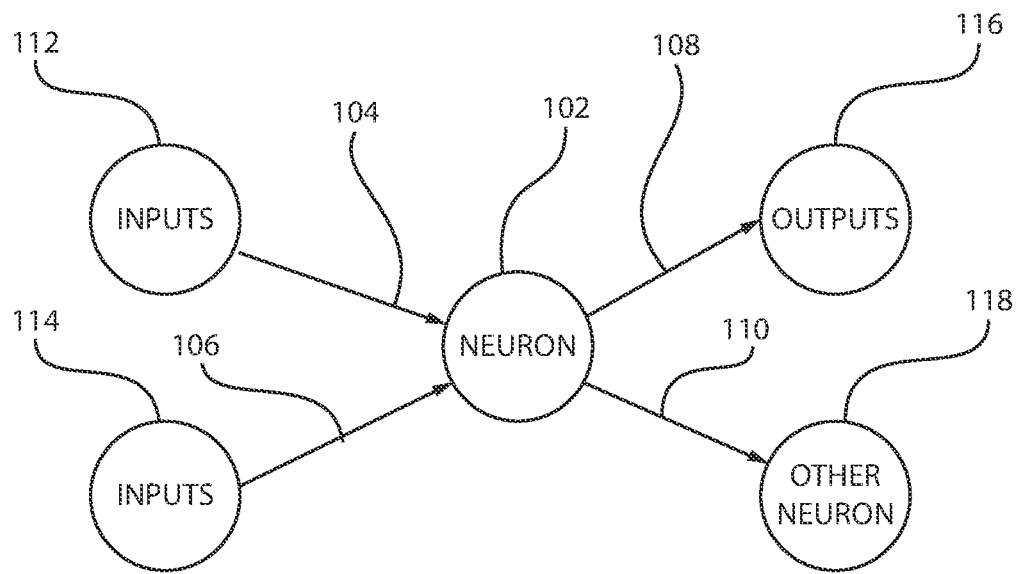
FIG. 1 depicts a simplified diagram of input and output connections of a biological neuron.

Detailed embodiments of the claimed structures and methods are described herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present description. For purposes of the description hereinafter, the terms "upper", "lower", "right", "left", "vertical", "horizontal", "top", "bottom", and derivatives thereof shall relate to the embodiments of the disclosure, as it is oriented in the drawing figures. The terms "positioned on" means that a first element, such as a first structure, is present on a second element, such as a second structure, wherein intervening elements, such as an interface structure, e.g. interface layer, can be present between the first element and the second element. The term "direct contact" means that a first element, such as a first structure, and a second element, such as a second structure, are connected without any intermediary conducting, insulating or semiconductor layers at the interface of the two elements.

"Machine learning" is used to broadly describe a primary function of electronic systems that learn from data. In machine learning and cognitive science, ANNs are a family of statistical learning models inspired by the biological neural networks of animals, and in particular the brain. ANNs can be used to estimate or approximate systems and functions that depend on a large number of inputs and are generally unknown.

It is understood in advance that although one or more embodiments are disclosed in the context of biological neural networks with a specific emphasis on modeling brain structures and functions, implementation of the teachings recited herein are not limited to modeling a particular environment. Rather, embodiments provided in the present description are capable of modeling any type of environment, including for example, weather patterns, arbitrary data collected from the internet, and the like, as long as the various inputs to the environment can be turned into a vector.

Although the methods and structures described herein are directed to an electronic system, for ease of reference and explanation various aspects of the disclosed electronic system are described using neurological terminology such as neurons, plasticity and synapses, for example. It will be understood that for any discussion or illustration herein of an electronic system, the use of neurological terminology or neurological shorthand notations are for ease of reference and are meant to cover the neuromorphic, ANN equivalent (s) of the described neurological function or neurological component.

ANNs, also known as neuromorphic or synaptronic systems, are computational systems that can estimate or approximate other functions or systems, including, for example, biological neural systems, the human brain and brain-like functionality such as image recognition, speech recognition and the like. ANNs incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

Instead of utilizing the traditional digital model of manipulating zeros and ones, ANNs create connections between processing elements that are substantially the functional equivalent of the core system functionality that is being estimated or approximated. For example, IBM's SyNapse computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Figure 2:
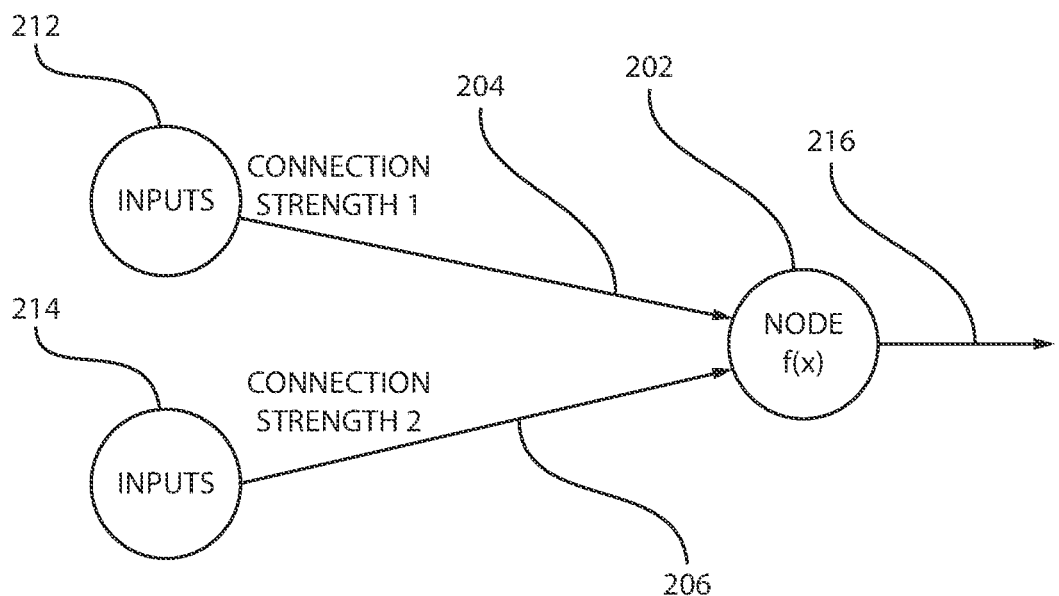
FIG. 2 depicts a known simplified model of the biological neuron shown in FIG. 1.
Figure 3:
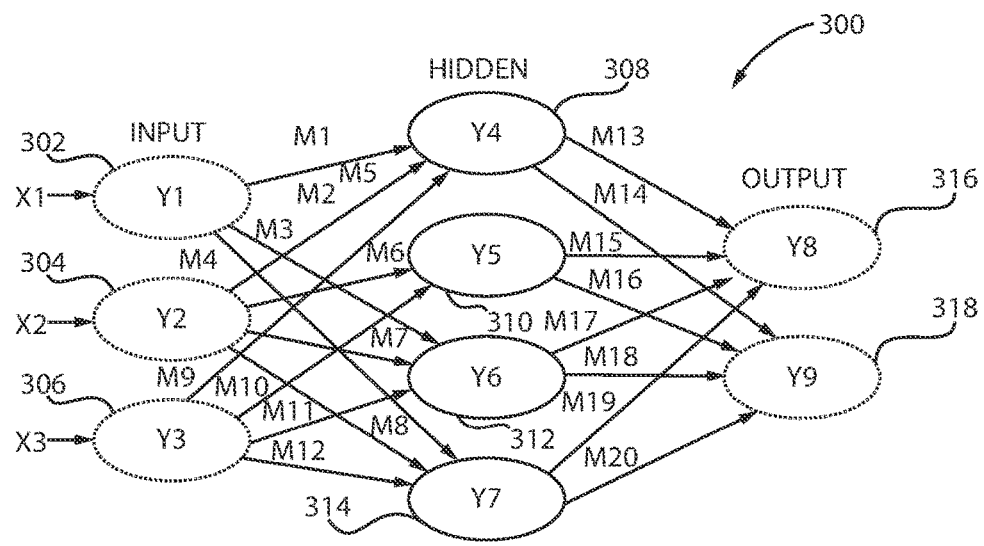
FIG. 3 depicts a known simplified model of an ANN incorporating the biological neuron model shown in FIG. 2.

As background, a general description of how a typical ANN operates will now be provided with reference to FIGS. 1, 2 and 3. As previously noted herein, a typical ANN models the human brain, which includes about one hundred billion interconnected cells called neurons. FIG. 1 depicts a simplified diagram of a biological neuron 102 having pathways 104, 106, 108, 110 that connect it to upstream inputs 112, 114, downstream output s116 and downstream "other" neurons 118, configured and arranged as shown. Each biological neuron 102 sends and receives electrical impulses through pathways 104, 106, 108, 110. The nature of these electrical impulses and how they are processed in biological neuron 102 are primarily responsible for overall brain functionality. The pathway connections between biological neurons can be strong or weak. When a given neuron receives input impulses, the neuron processes the input according to the neuron's function and sends the result of the function to downstream outputs and/or downstream "other" neurons.

Biological neuron 102 is modeled in FIG. 2 as a node 202 having a mathematical function, f(x) depicted by the equation shown in FIG. 2. Node 202 takes electrical signals from inputs 212, 214, multiplies each input 212, 214 by the strength of its respective connection pathway 204, 206, takes a sum of the inputs, passes the sum through a function, f(x), and generates a result 216, which can be a final output or an input to another node, or both. In the present description, an asterisk (*) is used to represent a multiplication. Weak input signals are multiplied by a very small connection strength number, so the impact of a weak input signal on the function is very low. Similarly, strong input signals are multiplied by a higher connection strength number, so the impact of a strong input signal on the function is larger. The function f(x) is a design choice, and a variety of functions can be used. A typical design choice for f(x) is the hyperbolic tangent function, which takes the function of the previous sum and outputs a number between minus one and plus one.

FIG. 3 depicts a simplified ANN model 300 organized as a weighted directional graph, wherein the artificial neurons are nodes (e.g., 302, 308, 316), and wherein weighted directed edges (e.g., m1 to m20) connect the nodes. ANN model 300 is organized such that nodes 302, 304, 306 are input layer nodes, nodes 308, 310, 312, 314 are hidden layer nodes and nodes 316, 318 are output layer nodes. Each node is connected to every node in the adjacent layer by connection pathways, which are depicted in FIG. 3 as directional arrows having connection strengths m1 to m20. Although only one input layer, one hidden layer and one output layer are shown, in practice, multiple input layers, hidden layers and output layers can be provided.

Similar to the functionality of a human brain, each input layer node 302, 304, 306 of ANN 300 receives inputs x1, x2, x3 directly from a source (not shown) with no connection strength adjustments and no node summations. Accordingly, y1=f(x1), y2=f(x2) and y3=f(x3), as shown by the equations listed at the bottom of FIG. 3. Each hidden layer node 308, 310, 312, 314 receives its inputs from all input layer nodes 302, 304, 306 according to the connection strengths associated with the relevant connection pathways. Thus, in hidden layer node 308, y4=f(m1*y1+m5*y2+m9*y3), wherein * represents a multiplication. A similar connection strength multiplication and node summation is performed for hidden layer nodes 310, 312, 314 and output layer nodes 316, 318, as shown by the equations defining functions y5 to y9 depicted at the bottom of FIG. 3.

ANN model 300 processes data records one at a time, and it "learns" by comparing an initially arbitrary classification of the record with the known actual classification of the record. Using a training methodology knows as "backpropagation" (i.e., "backward propagation of errors"), the errors from the initial classification of the first record are fed back into the network and used to modify the network's weighted connections the second time around, and this feedback process continues for many iterations. In the training phase of an ANN, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the network's calculated values for the output nodes to these "correct" values, and to calculate an error term for each node (i.e., the "delta" rule). These error terms are then used to adjust the weights in the hidden layers so that in the next iteration the output values will be closer to the "correct" values.

There are many types of neural networks, but the two broadest categories are feed-forward and feedback/recurrent networks. ANN model 300 is a non-recurrent feed-forward network having inputs, outputs and hidden layers. The signals can only travel in one direction. Input data is passed onto a layer of processing elements that perform calculations. Each processing element makes its computation based upon a weighted sum of its inputs. The new calculated values then become the new input values that feed the next layer. This process continues until it has gone through all the layers and determined the output. A threshold transfer function is sometimes used to quantify the output of a neuron in the output layer.

A feedback/recurrent network includes feedback paths, which mean that the signals can travel in both directions using loops. All possible connections between nodes are allowed. Because loops are present in this type of network, under certain operations, it may become a non-linear dynamical system that changes continuously until it reaches a state of equilibrium. Feedback networks are often used in associative memories and optimization problems, wherein the network looks for the best arrangement of interconnected factors.

The speed and efficiency of machine learning in feed-forward and recurrent ANN architectures depend on how effectively the crosspoint devices of the ANN crossbar array perform the core operations of typical machine learning algorithms. Although a precise definition of machine learning is difficult to formulate, a learning process in the ANN context can be viewed as the problem of updating the crosspoint device connection weights so that a network can efficiently perform a specific task. The crosspoint devices typically learn the necessary connection weights from available training patterns. Performance is improved over time by iteratively updating the weights in the network. Instead of following a set of rules specified by human experts, ANNs "learn" underlying rules (like input-output relationships) from the given collection of representative examples. Accordingly, a learning algorithm may be generally defined as the procedure by which learning rules are used to update and/or adjust the relevant weights.

The three main learning algorithm paradigms are supervised, unsupervised and hybrid. In supervised learning, or learning with a "teacher," the network is provided with a correct answer (output) for every input pattern. Weights are determined to allow the network to produce answers as close as possible to the known correct answers. Reinforcement learning is a variant of supervised learning in which the network is provided with only a critique on the correctness of network outputs, not the correct answers themselves. In contrast, unsupervised learning, or learning without a teacher, does not require a correct answer associated with each input pattern in the training data set. It explores the underlying structure in the data, or correlations between patterns in the data, and organizes patterns into categories from these correlations. Hybrid learning combines supervised and unsupervised learning. Parts of the weights are usually determined through supervised learning, while the others are obtained through unsupervised learning. Additional details of ANNs and learning rules are described in Artificial Neural Networks: A Tutorial, by Anil K. Jain, Jianchang Mao and K. M. Mohiuddin, IEEE, March 1996, the entirety of which is incorporated by reference herein.

As previously noted herein, in order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power.

Figure 4:
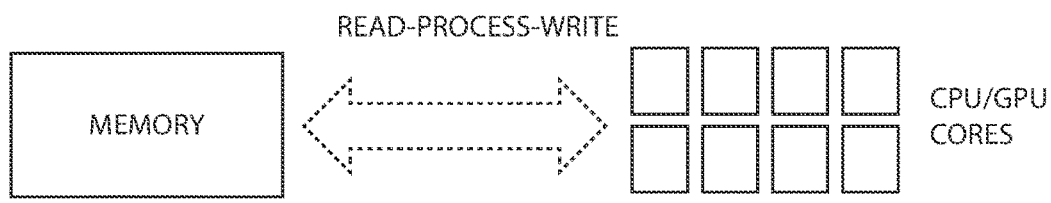
FIG. 4 depicts a simplified block diagram of a known weight update methodology.

Notwithstanding the potential for lower power consumption, executing offline training can be difficult and resource intensive because it is typically necessary during training to modify a significant number of adjustable parameters (e.g., weights) in the ANN model to match the input-output pairs for the training data. FIG. 4 depicts a simplified illustration of a typical read-process-write weight update operation, wherein CPU/GPU cores (i.e., simulated "neurons") read a memory (i.e., a simulated "synapse") and perform weight update processing operations, then write the updated weights back to memory.

In some embodiments, the methods, structures and systems disclosed herein provide a circuit consisted of metal oxide semiconductor field effect transistors (MOSFETs) and a capacitor, which can function as a resistive processing unit (RPU) used to indicate trainable resistive crosspoint circuit elements that can be used to. As used herein a "field effect transistor" is a transistor in which output current, i.e., source-drain current, is controlled by the voltage applied to the gate. A field effect transistor has three terminals, i.e., gate structure, source region and drain region. A "gate structure" means a structure used to control output current (i.e., flow of carriers in the channel) of a semiconducting device through electrical or magnetic fields. As used herein, the term "drain" means a doped region in semiconductor device located at the end of the channel, in which carriers are flowing out of the transistor through the drain. As used herein, the term "source" is a doped region in the semiconductor device, in which majority carriers are flowing into the channel. As used herein, the term "capacitor" denotes a structure including two electrically conductive materials, i.e., electrodes, separated and insulated from each other by a dielectric, i.e., node dielectric layer, for storing a charge. The term "electrode" as used to describe a component of the capacitor represents one of the two electrically conductive materials of the capacitor that are separated by the dielectric layer. A "node dielectric layer" is the dielectric layer that is present between the electrodes of the capacitor.

In some embodiments, the circuit disclosed herein provide all the important requirement of the RPU which is the ability to switch its resistance with 1000 or more resistance states in an incremental and symmetric manner and also with very low power at high speed. The state variable of an RPU is stored in a capacitor in the form of charges, and the resistance of the transistor whose gate terminal is connected to the capacitor is tuned as a function of the resultant voltage at the capacitor. Since all the transistors in the circuit are operating in the sub-threshold regime, this RPU implementation can be highly power-efficient and also area-efficient. When the gate-to-source voltage of a transistor is below the threshold voltage, the transistor is in sub-threshold regime and the drain current can be very small leading to little energy consumption.

Figure 5:
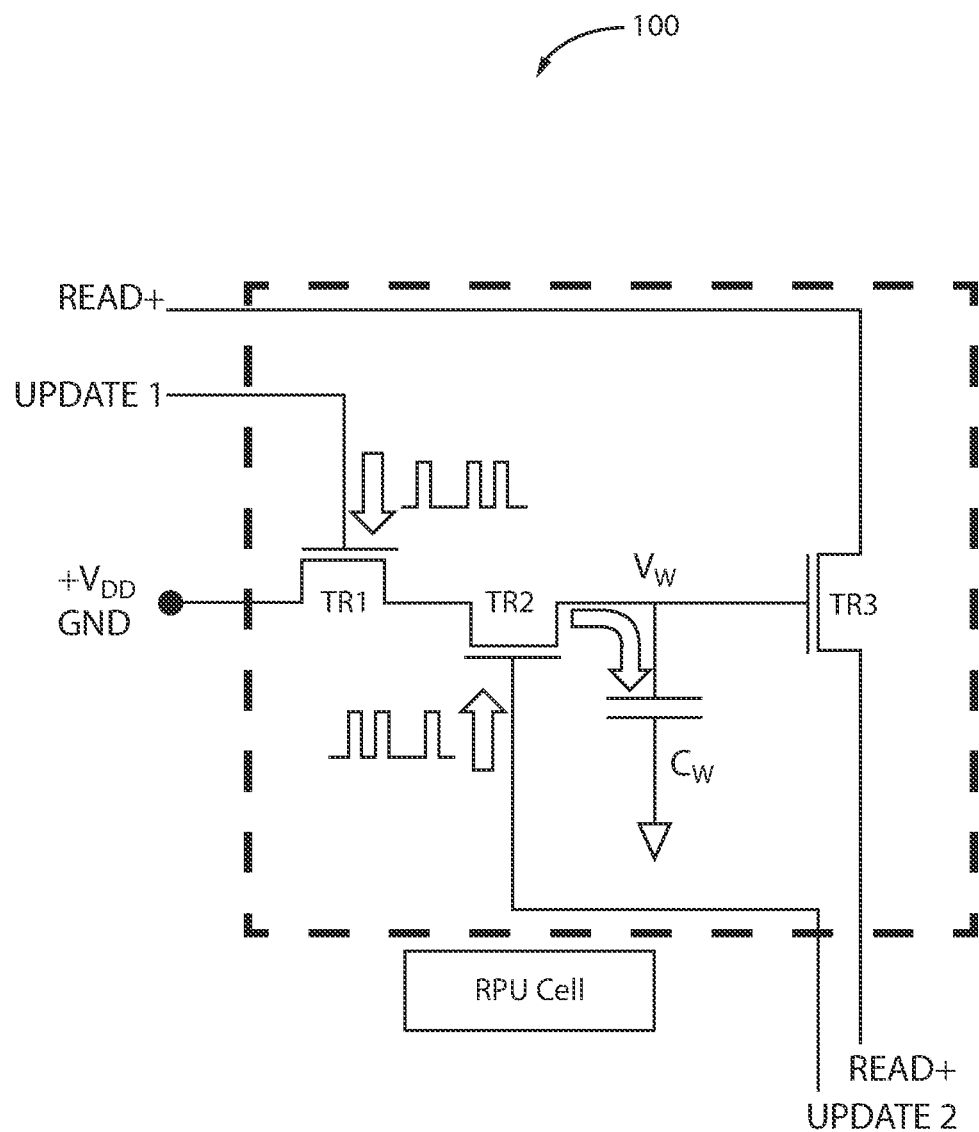
FIG. 5 is a circuit diagram depicting one embodiment of a resistive processing unit including three metal oxide semiconductor field effect transistors, and a capacitor.
Figure 6:
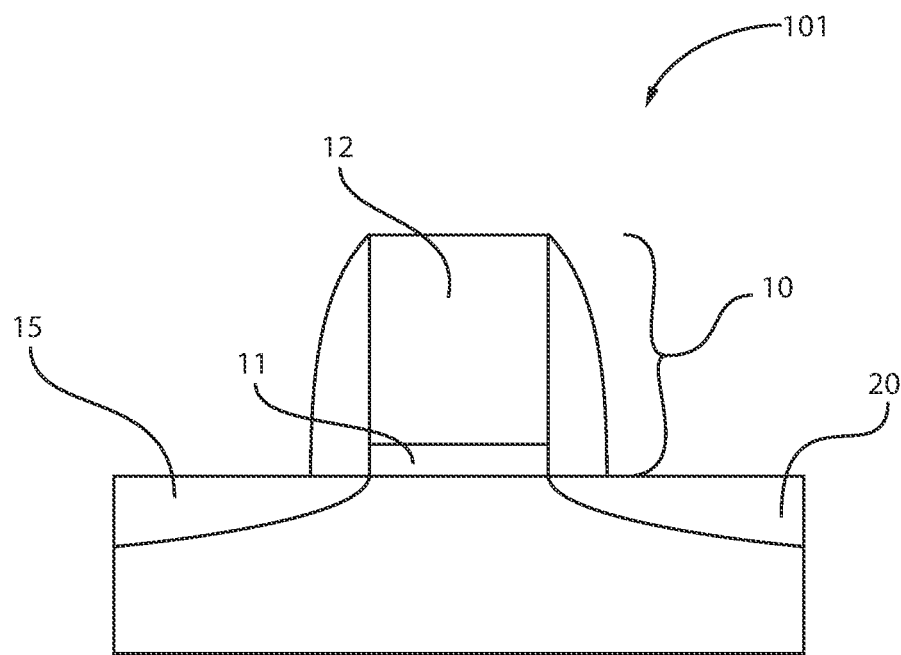
FIG. 6 is a side cross-sectional view depicting one embodiment of a semiconductor device.

FIG. 5 depicts one embodiment of a circuit diagram of an RPU cell including three transistors TR1, TR2, TR3 i.e., MOSFETs, and a capacitor Cw that can be implemented using CMOS semiconductor device technology and operates in a subthreshold regime. For example, the three transistors TR1, TR2, TR3 can be provided by n-type MOSFETs. One Although, the transistors TR1, TR2, TR3, are described as MOSFETS, it is noted that any field effect transistor (FET) or switching semiconductor device may provide the transistors TR1, TR2, TR3 of the RPU cell 100, such as Fin-type field effect transistors (FinFETs), vertical fin type field effect transistors (v-FinFETs), bipolar junction transistors, junction transistors and combinations thereof. One example of a field effect transistor (FET) 101 that is formed using CMOS semiconductor device technology is depicted in FIG. 6. Referring to FIG. 6, in some example, the field effect transistors (FETs) 100 that are used in the RPU units described herein can include a gate structure 10, source region 15 and drain region 20. The gate structure 10 is present on the channel region of the device separating the source region 15 from the drain region 20, in which applying electrical current to the gate structure 10 switches the device from an on current state to an off current state. The gate structure 10 typically includes a gate dielectric 11 that is present on the channel region portion of the substrate of the device, and a gate electrode 12 that is present on the gate dielectric 11.

As noted above, the FET device is formed using complementary metal oxide semiconductor device processing technology. The FET device 100 may be formed on a type IV semiconductor, such as silicon (Si) or silicon germanium (SiGe), or type III-V semiconductor, such as gallium arsenic (GaAs). The gate structure may be formed on the channel portion of the substrate that the FET is formed on using deposition, photolithography and etch processes. For example, a material stack can be formed on the channel region of the substrate using a deposition process, such as chemical vapor deposition, e.g., metal organic chemical vapor deposition or plasma enhanced chemical vapor deposition. The material stack can include a least one first dielectric layer for the gate dielectric 11. The gate dielectric 11 can be composed of an oxide, nitride or oxynitride. For example, the gate dielectric 11 can be composed of silicon oxide ($SiO_2$). In other examples, the gate dielectric 11 are composed of a high-k dielectric material, e.g., a dielectric material having a dielectric constant greater than silicon oxide, e.g., hafnium oxide ($HfO_2$). Following deposition of the material layer for the gate dielectric 11, material layer for the gate conductor 12 may be deposited to form the material stack for the gate structure 10. The gate conductor 12 may be composed of an electrically conductive material, such as a metal, e.g., tungsten (W); a metal nitride, e.g., tungsten nitride (WN); and/or a doped semiconductor, such as n-type doped polysilicon. In a following process step, an etch mask is formed atop the portion of the material stack for forming the gate structure 10 using photolithography. In some embodiments, the etch mask is composed of photoresist. In other embodiments, the etch mask includes a hard mask dielectric. In some embodiments, following formation of the etch mask, the material stack is etched, e.g., etched with an anisotropic etch process, such as reactive ion etch (RIE), to form the gate structure 10. A gate sidewall spacer can be formed on the sidewalls of the gate structure 10. The gate sidewall spacer may be composed of a dielectric, such as silicon nitride. The gate sidewall spacer can be formed using a deposition process, such as chemical vapor deposition (CVD), followed by an etch back process. In a following process step, the source and drain regions 15, 20 are ion implanted into the semiconductor substrate, as shown in FIG. 6, using ion implantation and an n-type or p-type dopant. The selection of an n-type or p-type dopant for the source and drain regions 10, 15 typically dictates the conductivity type of the semiconductor device, i.e., whether the device has an n-type or p-type conductivity. N-type dopants produce an excess of electrons so that charge carriers are provided by electrons. P-type dopants provide a deficiency of electrons, i.e., holes. The charge carriers in p-type conductivity devices are holes. In some embodiments, the source and drain regions are formed atop the substrate on portions of the substrate that are adjacent to the channel region portions using epitaxial growth processes.

The aforementioned process sequence is referred to as a gate first process sequence, in which the gate structures are formed before the source and drain regions. The FETs used with the RPU units described herein can also be formed using a gate last process. In a gate last process, a sacrificial gate structure is first formed on the channel region of the device; source and drain regions are formed while the sacrificial gate structure is present; and following forming the source and drain regions the sacrificial gate structure is replaced with a functional gate structure. In a gate last process, the gate functional gate structure may not be subjected to the activation anneal applied to the source and drain regions.

It is noted that the semiconductor device 100 that is depicted in FIG. 6 is a planar semiconductor device, in which the FET is formed atop a planar surface of a semiconductor device. The present description is not limited to only this type of device. For example, three dimensional and vertical devices are also within the scope of the methods and structures described herein. In some examples, the channel region can be provided by a fin structure, which is a semiconductor body having a height that is greater than its width. The fin structure may be positioned atop a planar semiconductor substrate, or may be positioned atop a dielectric layer. It is noted that the above descriptions of the process steps for forming FET devices are only some examples of CMOS processing suitable for use for forming the FETs 100 of the RPUs disclosed herein.

Figure 7:
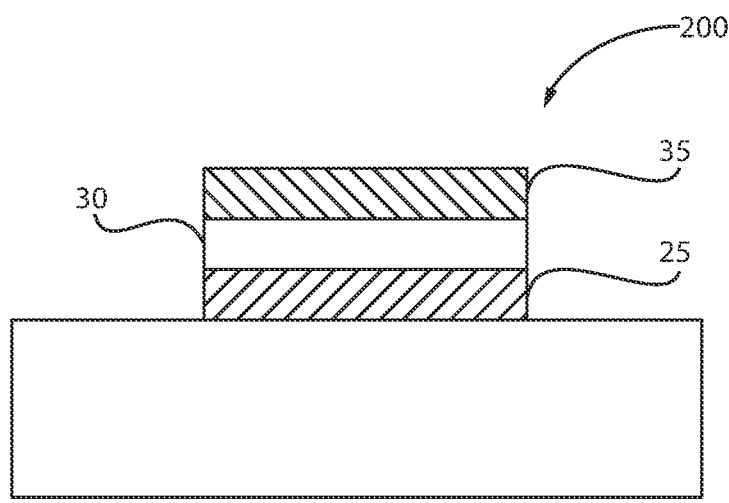
FIG. 7 is a side cross-sectional view depicting one embodiment of a capacitor device.

The capacitor Cw that is formed using the methods and structures disclosed herein can also be formed using CMOS processing. The capacitor Cw may be a planar capacitor 200 as depicted in FIG. 7 including a first electrode 25, a node dielectric layer 30 and a second electrode 35, in which the node dielectric layer 30 is positioned between and separating the first and second electrodes 25, 35. The first and second electrodes 25, 30 can be composed of an electrically conductive material, such as a metal or doped semiconductor. The node dielectric layer 30 may be composed of an oxide, nitride or oxynitride material. For example, the node dielectric layer 30 can be silicon dioxide, spin-on glass, polyimide, diamond-like carbon etc. Each of the first and second electrodes 25, 35 may be an electrically conductive material, such as a metal, e.g., aluminum, copper, tungsten, gold, silver and combinations thereof, or a conductive semiconductor, such as n-type polysilicon. The material layers for the capacitor 200 may be deposited using chemical vapor deposition (CVD) or physical vapor deposition (PVD) similar to the deposition processes that have been described above for forming the FET devices 100. Following deposition, the material stack of the layers for the first electrode 25, node dielectric layer 30 and the second electrode 35, the material stack can be patterned and etched to provide the dimensions for the capacitor. The pattern and etch processes described above for the FET 100 devices are equally applicable for the capacitor 200. It is noted that FIG. 7 depicts a capacitor having a planar orientation that is formed on the upper surface of a substrate. The scope of the methods and structures described herein are not limited to only this example. For example, the capacitor can be positioned vertically within a trench formed in the substrate. It is noted that any geometry capacitor is suitable for use with the methods and structures described herein.

FIG. 5 depicts one embodiment of a RPU unit that includes FETs TR1, TR2, R3 and capacitors Cw. The FETs TR1, TR2, TR3 and capacitors Cw depicted in FIG. 5 may be formed using CMOS processing, i.e., CMOS processing for the FETs 100 and capacitors 200, as described with reference to FIGS. 6 and 7. In one embodiment, the resistive processing unit (RPU) includes a pair of transistors TR1, TR2 connected in series providing an update function for a weight of a training methodology to the RPU; and a read transistor TR3 for reading the weight of the training methodology for the RPU. In some embodiments, the RPU only includes three FETs TR1, TR2, TR3. At least one of the read transistor TR3 and the pair of transistors TR1, TR2 that are connected in series are metal oxide semiconductor field effect transistors. In one embodiment, the RPU unit depicted in FIG. 5 includes a capacitor Cw connecting a gate of the read transistor TR3 to the pair of transistors TR1, TR2 providing the update function for the RPU. The capacitor Cw stores the weight of training methodology for the RPU. In some embodiments, RPU processing unit depicted in FIG. 5 operates in a subthreshold regime, where the gate-to-source voltage of a transistor is below the threshold voltage. The RPU unit can be switched at up to 1000 different incremental states for use as a trainable resistive crosspoint device that can accelerate an artificial neural networks (ANN's) ability to learn implement algorithms, such as online neural network training, matrix inversion, matrix decomposition and combinations thereof.

Referring to FIG. 5, in some embodiments, the pair of transistors TR1, TR2 for providing the update function to the RPU unit includes a first field effect transistor (FET) TR1 and a second field effect transistor (FET) TR2. For example, the first field effect transistor providing the update function to the RPU unit can have a first source/drain region connected to a positive supply voltage (Vdd) (GRND), and a first gate structure connected to a first end of an update line UPDATE 1. The second source/drain region of the first FET TR1 may be connected to the second FET TR2 of the RPU unit. Still referring to FIG. 5, the RPU unit includes a second FET TR2 having a first source/drain region connected to a second source/drain region of the first FET TR1, and a second gate connected to a second end of the update line UPDATE 2, wherein the second source/drain region of the second FET TR2 is connected to the capacitor Cw. One of the update lines UPDATE 1, UPDATE 2 is connected to a row of an array used in the artificial neural networks (ANN), and the second of the update lines UPDATE 1, UPDATE 2 is connected to a column of an array used in the artificial neural networks (ANN). When the current applied to the gates of the first and second transistors TR1, TR2 through the first and second update lines UPDATE 1, UPDATE 2, the capacitor Cw can be charged or discharged. In one embodiment, the first source/drain region of the first FET TR1 is connected to the programming signal, i.e., +Vdd, GRND. In some embodiments, the first and second FET TR1, TR2, i.e., pair of first and second transistors for the update function, may be referred to as a coincidence detector because both TR1 and TR2 can conduct current when only both signals at UPDATE 1 and UPDATE 2 are coincided to be ON.

In some embodiments, the capacitor Cw is present between the gate structure of the read FET TR3 and a second source/drain region of the second FET TR2 of the pair of transistors TR1, TR2 for providing the update function. The capacitor Cw stores a weight of training for resistive crosspoint circuit elements for an artificial neural network. In some embodiments, updating the weight of training stored on the capacitor Cw includes charging or discharging the capacitor through the first pair of transistors, i.e., first FET TR1 and second FET TR2.

The read transistor TR3 can be a field effect transistor, i.e., read FET TR3, similar to the field effect transistors that provide the first and second transistors TR1, TR2 that provide the update function for the RPU device. The gate of the read FET TR3 can be connected to the capacitor Cw. The source and drain regions of the read FET TR3 can be connected to the read line READ+. The read transistor can be a variable resistor for reading the weight stored on the capacitor. More specifically, in some embodiments, the at least one read transistor TR3 reads weight of training through a channel resistance of the at least one read transistor TR3. In some embodiments, the channel resistance of the at least one read transistor TR3 is modulated by the charge stored on the capacitor Cw consistent with the weight of training being stored.

Referring to FIG. 5, in one embodiment, the capacitor Cw holds electric charges which represents the weight value stored in the cell, and the first and second field effect transistors TR1, TR2 serve as update transistors to charge/discharge this capacitor and change the stored weight value. A third field effect transistor TR3 is a read transistor whose channel resistance is modulated by the voltage drop of the capacitor. One can read out the stored weight by measuring the channel resistance of the read transistor TR3. By biasing all the transistors TR1, TR2, TR3 in the RPU cell to operate in sub-threshold regime, the power consumption by this cell can be potentially minimal and the area of the cell is also very small by utilizing the smallest transistors available in the technology and deep trench capacitors. All the transistors in the cell can be of the minimum size available in the technology, and operate nearly in the off-state with little current, so that the power and area efficiency can be high. Therefore, the circuit depicted in FIG. 5 can have an extremely power-efficient and area-efficient. In some embodiments, the RPU cell provided for analog increment switching with a substantially linear symmetric weight update for the capacitor Cw.

Figure 8:
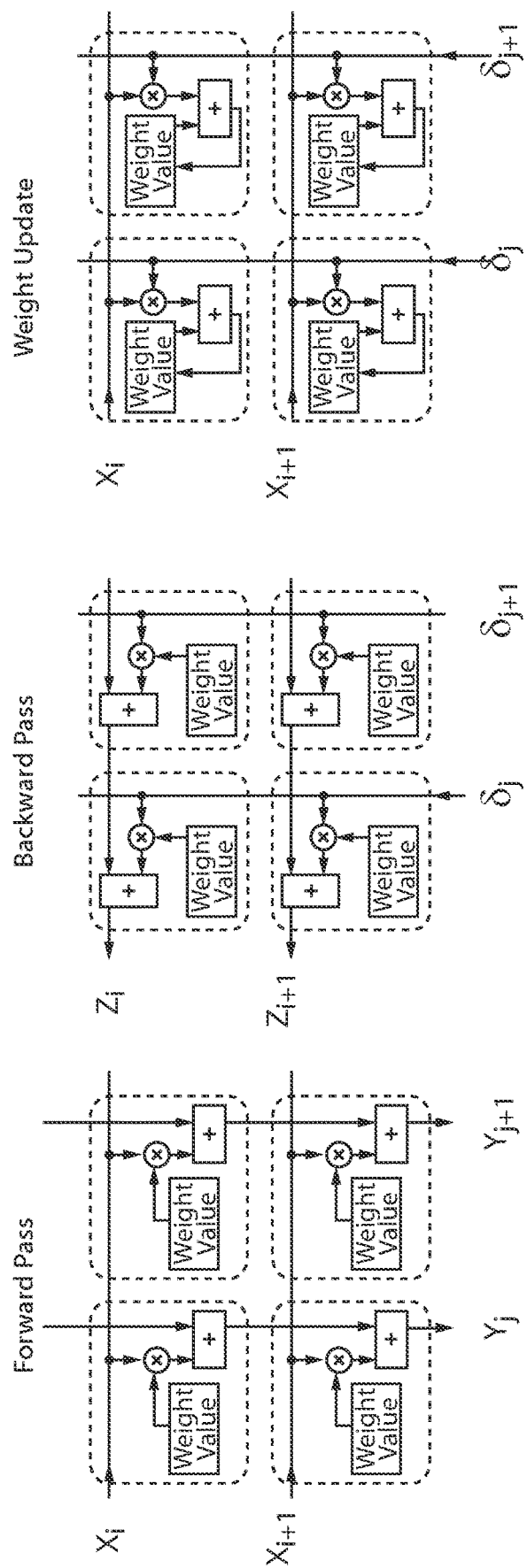
FIG. 8A is a circuit diagram depicting one embodiment of a resistive process unit including three metal oxide semiconductor field effect transistors and a capacitor operating in forward pass mode.
FIG. 8B is a circuit diagram depicting one embodiment of a resistive process unit including three metal oxide semiconductor field effect transistors and a capacitor operating in backward pass mode.
FIG. 8C is a circuit diagram depicting one embodiment of a resistive process unit including three metal oxide semiconductor field effect transistors and a capacitor operating in weight update mode.

FIG. 8A is a circuit diagram depicting one embodiment of four resistive process units (RPUs) in 2×2 crosspoint configuration including three field effect transistors (FETS), e.g., metal oxide semiconductor field effect transistors (MOSFETs) and a capacitor Cw operating in forward pass operation of error-backpropagation algorithm as an example. During the forward pass, input data (xi) is given to the rows in the form of voltage amplitudes, pulse width or stochastic bitstreams and are multiplied by the internal weights stored in each RPU. The resultant currents (yj) will be integrated at the columns, and this completes the forward pass operation. The RPU design disclosed herein can perform this operation.

FIG. 8B is a circuit diagram depicting one embodiment of four resistive process units each of which including three metal oxide semiconductor field effect transistors and a capacitor operating in backward pass mode. During the backward pass, calculated delta value data (delta_j) is given to the columns in the form of voltage amplitudes, pulse width or stochastic bitstreams and are multiplied by the internal weights stored in each RPU. The resultant currents (zi) will be integrated at the columns, and this completes the forward pass operation. The RPU designs disclosed herein can perform this operation.

FIG. 8C is a circuit diagram depicting one embodiment of four resistive process units each of which including three metal oxide semiconductor field effect transistors and a capacitor operating in weight update mode. During the weight update operation, xi and delta_j data previously calculated in forward and backward operations are provided to the RPU array, and the weights stored in each RPU are updated by the amount corresponding to the multication of xi and delta_j. The RPU design disclosed herein can perform this operation.

Figure 9:
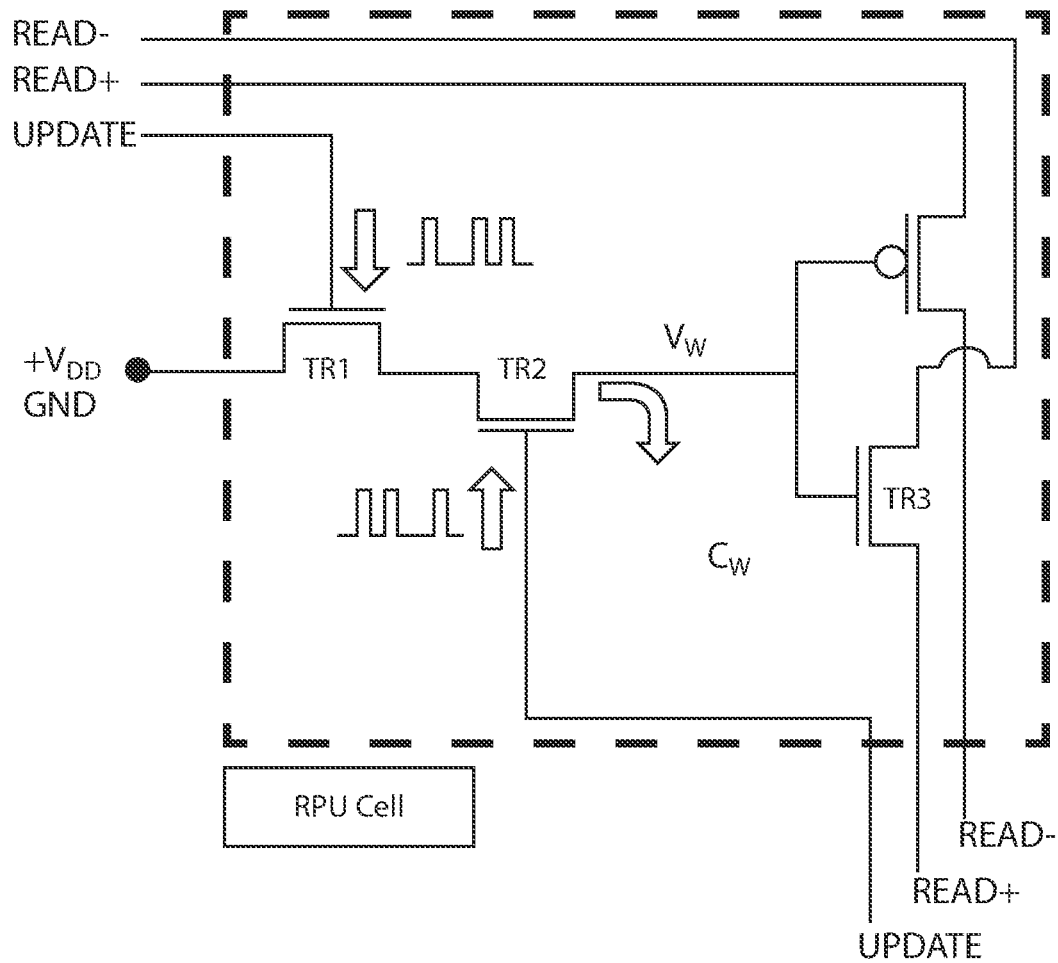
FIG. 9 is a circuit diagram depicting one embodiment of a resistive process unit (RPU) including four metal oxide semiconductor field effect transistors, and a capacitor.

FIG. 9 is a circuit diagram depicting one embodiment of a resistive process unit (RPU) including four transistors TR1, TR2, TR3, TR4 and a capacitor Cw. The embodiment of the resistive processing unit (RPU) that is depicted in FIG. 9 adds a second read transistor TR4 for the read function that works in combination with a first transistor TR3, in which the pair of read transistors TR3, TR4 provide for differential reading of the weight of the capacitor Cw. For example, the second read transistor TR4 may be a p-type MOSFET, while first read transistor TR3, and the pair of update transistors TR1, TR2 may be n-type MOSFETs. Differential reading of the weight of the capacitor Cw provides that the pair of read transistors TR3, TR4 can determine a +/− value for the charge being stored on the capacitor Cw.

In some embodiments, the resistive processing unit (RPU) depicted in FIG. 9 includes a first pair of transistors TR1, TR2 connected in series providing an update function for a weight of a training methodology to the RPU. The first pair of transistors TR1, TR2 can include a first field effect transistor (FET) TR1 and a second field effect transistor (TR2). The first and second field effect transistors TR1, TR2 that are depicted in FIG. 9 are similar to the first and second field effect transistors TR1, TR2 that are depicted in FIG. 5. Therefore, the above description of the first and second transistors TR1, TR2 that are described above with reference to FIG. 5 are suitable for describing at least one embodiment of the first and second field effect transistors TR1, TR2 that are depicted in FIG. 9. For example, The pair of transistors TR1, TR2 for providing the update function may include a first FET TR1 having a first source/drain region connected to a positive supply voltage (Vdd), and a first gate structure connected to a first end of an update line UPDATE 1; and a second FET TR2 having a first source/drain region for the second FET TR2 connected to a second source/drain region of the first FET TR1, a second gate connected to a second end of the update line UPDATE 2, wherein the second source/drain region of the second FET TR2 is connected to the capacitor Cw.

Referring to FIG. 9, the RPU unit may also include a second pair of transistors, i.e., a third field effect transistor (FET) TR3 and a fourth field effect transistor (FET) TR4 for reading the weight of the training methodology by differential weight reading. Each of the gate structures of the third and fourth FETS TR3, TR4 are connected to the capacitor Cw. The source and drain regions of the third FET TR3 are connected to a positive read line READ+. The source and drain regions for the fourth FET TR4 are connected to a negative read line READ−.

The capacitor Cw stores the weight of training methodology for the RPU. The capacitor Cw that is depicted in FIG. 9 is similar to the capacitor Cw that is depicted in FIG. 5. Therefore, the above description of the capacitor Cw that is depicted in FIG. 5 is suitable for describing at least one embodiment of the capacitor Cw that is depicted in FIG. 9. Referring to FIG. 9, the capacitor is present between the gate structure of the second pair of transistors T3, T4 for reading the weight of the training methodology and a second source/drain region of the second FET T2 of the pair of transistors T1, T2 for providing the update function to the RPU.

The RPU processing unit depicted in FIG. 9 operates in a subthreshold regime By biasing all the transistors TR1, TR2, TR3, T4 in the RPU cell to operate in sub-threshold regime, the power consumption by this cell can be potentially minimal and the area of the cell is also very small by utilizing the smallest transistors available in the technology and deep trench capacitors. Therefore, the circuit depicted in FIG. 9 can have an extremely power-efficient and area-efficient. In some embodiments, the RPU cell provided for analog increment switching with a substantially linear symmetric weight update for the capacitor Cw.

Figure 10:
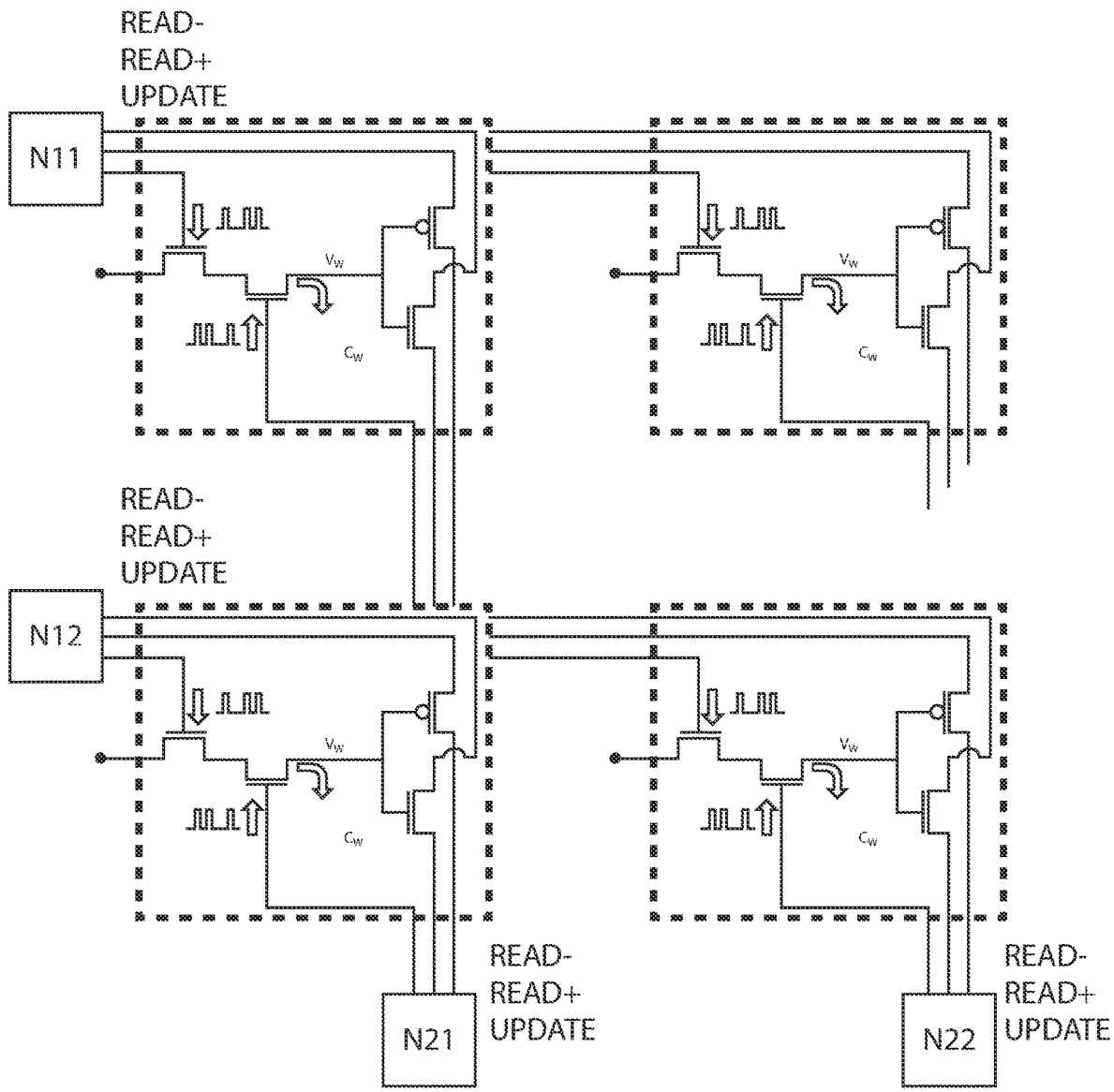
FIG. 10 is a circuit diagram depicting one embodiment of a resistive processing unit (RPU) arranged in a 2×2 crosspoint array.

FIG. 10 is a circuit diagram depicting one embodiment of a resistive processing unit (RPU) depicted in FIG. 5 arranged in a 2×2 crosspoint array. The RPU unit depicted in FIG. 9 may also be arranged in a 2×2 crosspoint array similar to that depicted in FIG. 10.

In another aspect, a method for storing weight of training in a resistive processing unit (RPU) of an artificial neural network (ANN) is provided that includes providing a capacitor Cw for storing a weight of training for resistive crosspoint circuit elements for an artificial neural network (ANN). The capacitor Cw has been described above with reference to FIGS. 5-10. A first pair of transistors TR1, TR2 can be connected to the capacitor Cw for updating the weight of training stored on the capacitor Cw. The method can further include providing at least one read transistor TR3, TR4 having a gate structure connected to the capacitor Cw for reading the weight of training that is stored on the capacitor Cw. The first pair of transistors TR1, TR2 have been described above with reference to FIGS. 5-10. In some embodiments, in which the RPU cell is only composed of three transistors TR1, TR2, TR3, the read function of the RPU cell can be provided by a single transistor, as described above with reference to FIG. 5. In some embodiments, in which the RPU cell is only composed of four transistors TR1, TR2, TR3, TR4 the read function of the RPU cell can be provided by a single pair of transistor TR3, TR4, as described above with reference to FIG. 9. The single pair of transistors TR3, TR4 provide for differential reading of the weight being stored on the capacitor Cw.

In some embodiments, updating the weight of training stored on the capacitor Cw includes charging or discharging the capacitor Cw through the first pair of transistors TR1, TR2. In some embodiments, the at least one read transistor TR3, TR4 reads weight of training being stored on the capacitor Cw through a channel resistance of the at least one read transistor TR3, TR4. The channel resistance of the at least one read transistor TR3, TR4 is modulated by the charge stored on the capacitor Cw consistent with the weight of training being stored. The transistors TR1, TR2, TR3, TR4 of the RPU unit can be operated in a subthreshold regime.

Having described preferred embodiments of the resistive processing unit (RPU) disclosed herein (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A resistive processing unit (RPU) comprising:
   a pair of transistors directly connected in series through a connecting pair of source/drain regions for pair of transistors providing an update function for a weight of a training methodology to the RPU, wherein the connecting pair of source/drain regions are in direct contact with one another to provide a series connection without any further circuitry at the connecting pair of source/drain regions that provides the series connection between the pair of transistors;
   a read transistor for reading said weight of the training methodology; and
   a capacitor between and directly connecting a gate of the read transistor to the pair of transistors providing the update function for the RPU, the capacitor directly connected to one edge source/drain region of one transistor in the pair of transistors opposite connecting pair of source/drain regions, wherein a node of the capacitor connects to a gate of the read transistor, and the capacitor connects to one edge source/drain of one transistor in the pair of transistors opposite the connecting pair of source/drain regions.

2. The resistive processing unit of claim 1, wherein the read transistor is a metal oxide semiconductor field effect transistor.

3. The resistive processing unit of claim 1, wherein at least one of the pair of transistors that are connected in series is a metal oxide semiconductor field effect transistor.

4. The resistive processing unit of claim 1, wherein the resistive processing unit (RPU) operates in a subthreshold regime.

5. The resistive processing unit of claim 1, wherein the resistive processing unit (RPU) switches up to 1000 different incremental states.

6. The resistive processing unit of claim 1, wherein the capacitor comprises a node dielectric separating two electrodes.

7. The resistive processing unit of claim 1, wherein the pair of transistors for providing the update function comprises:
   a first field effect transistor (FET) having a first source/drain region connected to a positive supply voltage (Vdd), and a first gate structure connected to a first end of an update line; and
   a second field effect transistor (FET) having a first source/drain region for the second transistor connected to a second source/drain region of the first field effect transistor (FET).

8. The resistive processing unit of claim 7, wherein a second gate of the second field effect transistor is connected to a second end of the update line.

9. The resistive processing unit of claim 8, wherein the second source/drain region of the second field effect transistor (FET) is connected to the capacitor.

10. The resistive processing unit of claim 7, wherein the capacitor is present between the gate structure of the read transistor and a second source/drain region of the second field effect transistor (FET) of the pair of transistors for providing the update function.

11. A method of storing weight of training in a resistive processing unit (RPU) of artificial neural network comprising:
    providing a capacitor for storing a weight of training for resistive crosspoint circuit elements for an artificial neural network;
    connecting a first pair of transistors to the capacitor for updating the weight of training stored on the capacitor, wherein the first pair of transistors are directly connected in series through a connecting pair of source/drain regions at a series connection without any further circuitry at the connecting pair of source/drain regions of source/drain regions that provides the series connection between the pair of transistors, wherein an edge source/drain region is present for one transistor of the first pair of transistors that is opposing the connecting pair of source/drain regions for the first pair of transistors; and
    providing at least one read transistor having a gate structure connected to the capacitor for reading the weight of training that is stored on the capacitor, the capacitor directly connected to the edge source/drain region, the capacitor between and directly connecting the gate structure of the read transistor to the pair of transistors.

12. The method of claim 11, wherein a node of the capacitor connects to a gate of the read transistor, and the capacitor connects to an edge source/drain of one transistor in the pair of transistors opposite the connecting pair of source/drain regions.

13. The method of claim 11, wherein updating the weight of training stored on the capacitor comprises charging or discharging the capacitor through the first pair of transistors.

14. The method of claim 11, wherein the at least one read transistor reads weight of training through a channel resistance of the at least one read transistor.

15. The method of claim 14, wherein the channel resistance of the at least one read transistor is modulated by charge stored on the capacitor consistent with the weight of training being stored.

16. The method of claim 15, wherein the first pair of transistors and the at least one read transistor are operated in a subthreshold regime.

17. The method of claim 15, wherein the at least one read transistor comprises a pair of transistors for reading the weight of a training methodology by differential weight reading.

18. The method of claim 11, wherein the first pair of transistors to the capacitor are metal oxide semiconductor field effect transistors.

19. The method of claim 11, wherein the at least one read transistor is a metal oxide semiconductor field effect transistor.

20. The method of claim 11, wherein the RPU unit switches up to 1000 different incremental states.

* * * * *